United States Patent [19]

Bergdahl et al.

[11] E Re. 29,435

[45] Reissued Oct. 11, 1977

[54] METHOD OF SUPERVISING THE FILLING LEVEL IN HOPPERS, SHAFTS, SILOS AND THE LIKE FOR MISCELLANEOUS MATERIALS AND MEANS FOR PERFORMING THE METHOD

[75] Inventors: Sven Gunnar Bergdahl, Uppl. Vasby; Erik Torsten Wangdahl, Anmeberg, both of Sweden

[73] Assignee: Asea Aktiebolag, Vasteras, Sweden

[21] Appl. No.: 670,419

[22] Filed: Mar. 25, 1976

Related U.S. Patent Documents

Reissue of:

[64] Patent No.: 3,927,569
Issued: Dec. 23, 1975
Appl. No.: 453,389
Filed: Mar. 21, 1974

[30] Foreign Application Priority Data

Mar. 21, 1973 Sweden ..... 7303961

[51] Int. Cl.[2] ..... G01F 23/00
[52] U.S. Cl. ..... 73/290 V; 116/114 B
[58] Field of Search ..... 73/290 V, 290 B, 290 R; 116/114 B

[56] References Cited

U.S. PATENT DOCUMENTS

| | | | |
|---|---|---|---|
| 910,606 | 1/1909 | Swanson | 116/114 B |
| 2,561,763 | 7/1951 | Waters et al. | 73/228 |

FOREIGN PATENT DOCUMENTS

| | | | |
|---|---|---|---|
| 1,062,663 | 4/1954 | France | 73/290 V |
| 1,020,465 | 12/1957 | Germany | 73/194 B |

*Primary Examiner*—James J. Gill
*Assistant Examiner*—Anthony V. Ciarlante
*Attorney, Agent, or Firm*—Watson, Cole, Grindle & Watson

[57] ABSTRACT

For supervising the filling level in an elongated space, such as hoppers, shafts, silos and the like, for miscellaneous granular material, the movement of the material is transformed into vibrations and the vibrations are converted into indicating signals which indicate the filling level. This may be accomplished by a plurality of rods which extend through the wall of the space and are subjected to the vibrations produced by solid materials falling through the space. This may be done by providing rods which extend beyond the wall into the space, and by accelerometers or the like which detect the vibrations and convert them into electrical signals which may control the discharge from the shaft.

12 Claims, 3 Drawing Figures

METHOD OF SUPERVISING THE FILLING LEVEL IN HOPPERS, SHAFTS, SILOS AND THE LIKE FOR MISCELLANEOUS MATERIALS AND MEANS FOR PERFORMING THE METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method of supervising the filling level in hoppers, shafts, silos and the like for miscellaneous materials, such as blaststone, broken and crushed mineral products.

2. The Prior Art

Previously a plummet has often been used to supervise the filling level in hoppers, this being lowered to the surface of the material which has been poured in and the length of the plummet line then being measured or recorded. In general this method can only be used in vertical hoppers or the like, and it also means that the flow of material must be discontinued before the plummet is lowered, which causes practical drawbacks.

Another method used for the same purpose is that of emitting an acoustic signal towards said surface, receiving the reflected echo and, from the transmission time of the sound, determining the level of said surface. However, the use of this method is limited to hoppers of about 30 m deep and furthermore they must be at least substantially straight if the method is to be reliable. Furthermore, the use of this method is complicated in the case of magnetic materials such as iron ore, because the emitters used are provided with permanent magnets and these become coated with magnetic dust which disturbs the measuring function in an unacceptable manner.

Other methods using conducting or capacitive sensing members which are lowered into the hopper to be influenced by the material cannot be used for chunky objects which are often thrown down from a considerable height, as the sensing members would very quickly be destroyed. It has therefore been impossible to use these methods in practice.

Another method, which however has its limitations, is to locate radioactive elements at various levels down one side of the hopper, the radiation from these elements being recorded by a sensing member on the opposite side of the hopper. However, it has not been found practical to use this method for chunky objects in view of the risk of damage to both the radioactive elements and the sensing members, with consequent risk to personnel. Furthermore, it is often difficult to gain access to the various levels in the hopper to assemble the equipment.

Recently a method has been used, particularly in mining shafts, in which the weight and/or volume of material fed in is recorded, from which the filling level in the hopper can be calculated. However, this method may give considerable measuring errors which are gradually accumulated.

SUMMARY OF THE INVENTION

The object of the present invention is consequently to effect a method of supervising the filling level in collecting hoppers and the like, which does not have the limitations and drawbacks mentioned above and which offers a simple solution to the present problem by enabling simple and inexpensive mechanical and electrical components to be used which will withstand rough treatment from the miscellaneous moving objects and which can otherwise be fitted in a sheltered position.

In accordance with this the invention is substantially characterised in that the movement of the material is transformed to vibrations and these are converted to indicating signals which are brought to indicate the level to which the hopper or the like has been filled.

The invention also relates to a means for performing the method, said means being substantially characterised in that the hopper, etc. cooperates with at least one member which is arranged to be set in vibration by the passing objects and that this member communicates with an indicating mechanism which indicates the level to which the hopper has been filled.

BRIEF DESCRIPTION OF THE DRAWINGS

The invention will be further explained with reference to a number of embodiments illustrated schematically in the accompanying drawings and in connection herewith additional features characteristic to the invention will be discussed.

DESCRIPTION OF THE PREFERRED EMBODIMENTS

Figure 1:
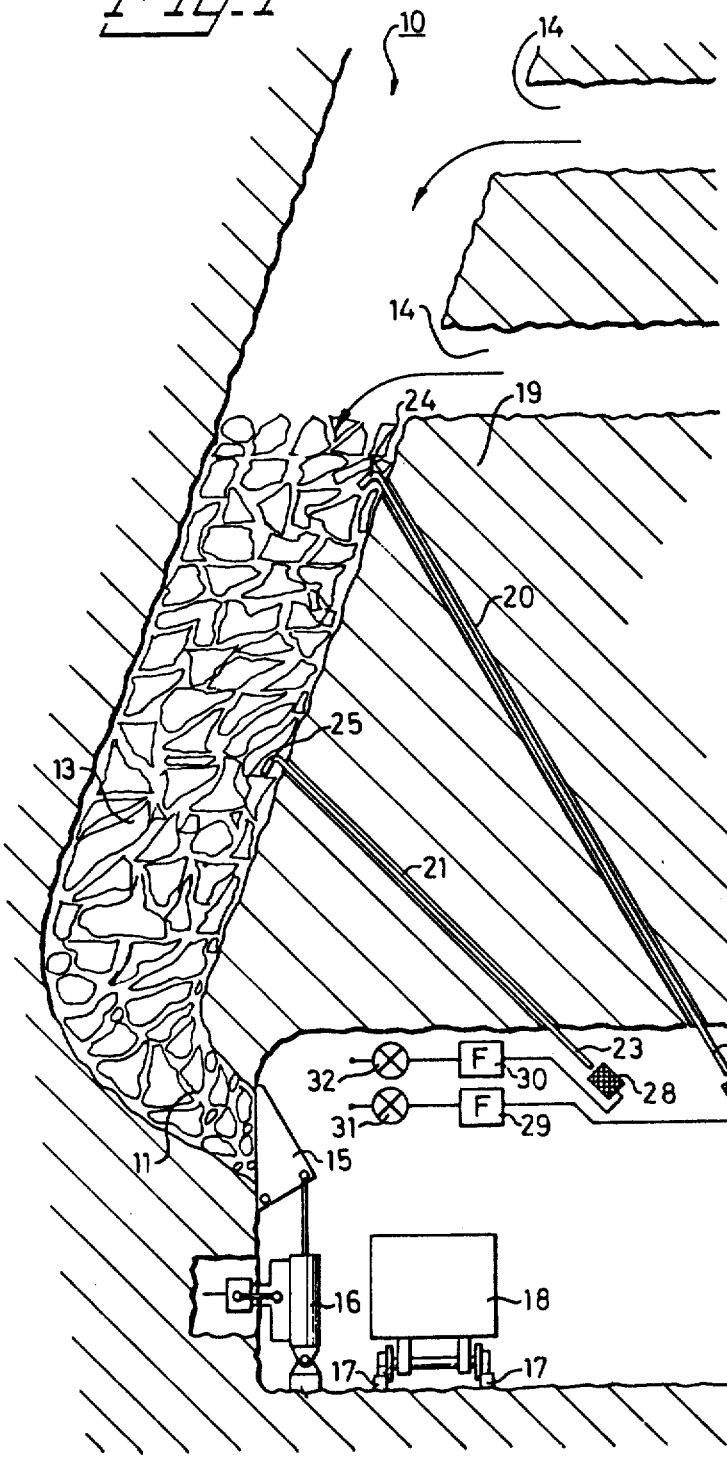
FIG. 1 of the drawings is a vertical section, shown schematically, of a collection hopper for miscellaneous material, in this case represented by a mining shaft, the use of the invention being described in connection therewith.
Figure 3:
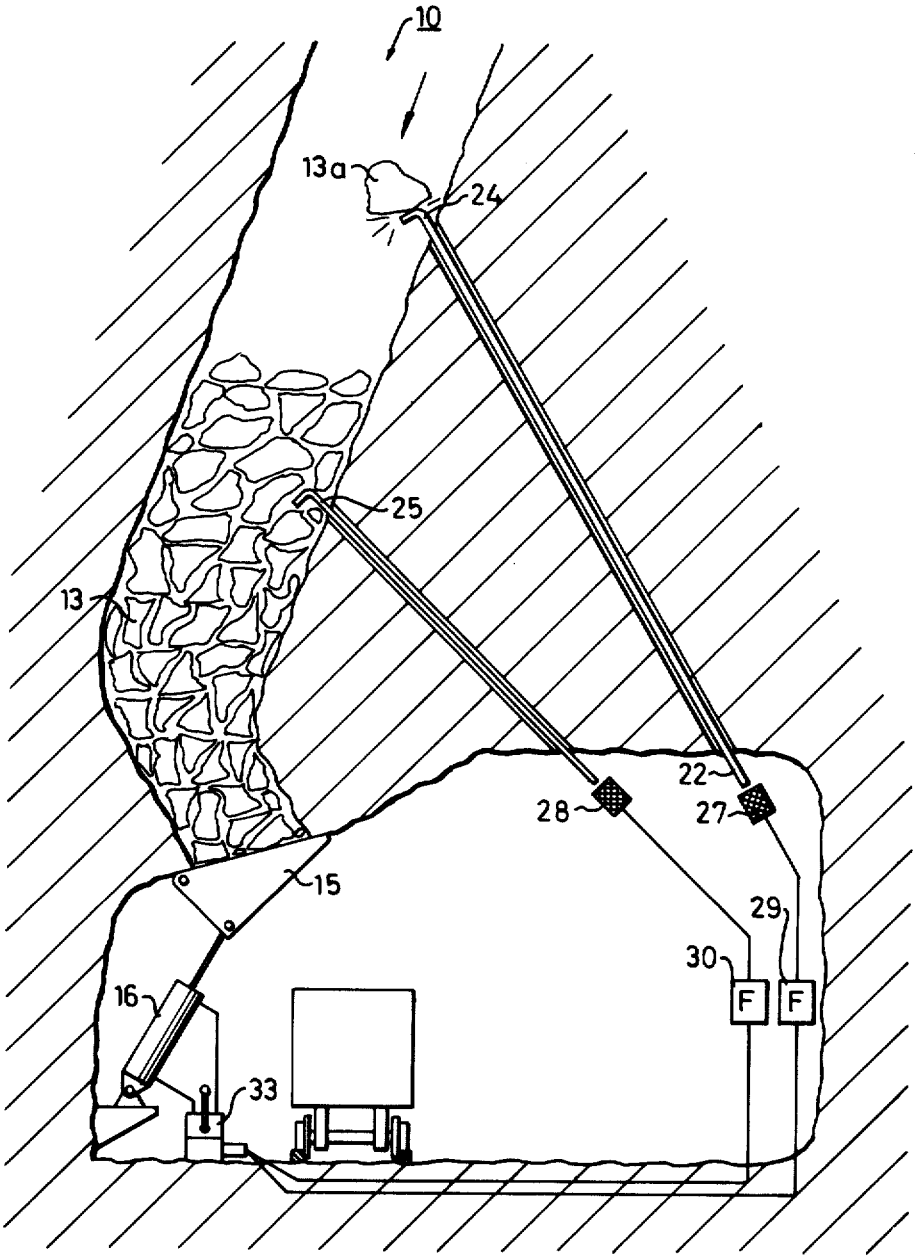

In FIGS. 1 and 3, 10 generally designates a mining shaft which in the example shown is at an angle to the vertical line. However, this does not exclude the possibility of the shaft being vertical. At the bottom of this shaft 10 is a curve 11 which is arranged to communicate with an unloading point, generally designated 12, for the miscellaneous material 13 collected in the shaft 10, 11. Openings 14 are provided at the top of the shaft, through which the material 13 can be poured in.

Between the curve 11 and the unloading point 12 is a pivotable hatch 15 of conventional type which is operated in the example shown by a hydraulic or pneumatic motor 16 of suitable type. Rails 17 are arranged on the unloading station, on which transport trucks 18 are moved to be filled through the hatch 15 when this is in its open position.

The object of the present invention is to be able to supervise the filling level in the shaft 10, 11, partly to prevent it from being completely emptied and partly to determine when the level falls below at least one predetermined level in order, for example, that at least one transport truck or set of trucks can be loaded without risk of loading from an empty hopper.

In order to perform this supervision, holes 20 and 21 are drilled through the wall 19 of the shaft 10, joining the unloading station 12 to the shaft 10. Through each of these holes a tube 22 or rod 23 is passed, preferably of some metal, metal alloy or the like, particularly steel.

The lower ends of these tubes or rods project into the unloading point 12 designed as a transport station, and in the example shown in FIG. 1 the top ends 24, 25, respectively, project into the path of movement of the material 13 in the shaft 10. These ends are shown as hooks bent downwards and have acquired this shape naturally because of the action of the falling material 13.

However, it is not absolutely necessary for the rods or tubes 22 and 23, respectively, to project into the path of movement of the material since the only condition which must be fulfilled for a successful result is that the movement of the material being tapped from the shaft sets the rods or the like in vibration, said vibration to be used for supervision of the level.

Figure 2:
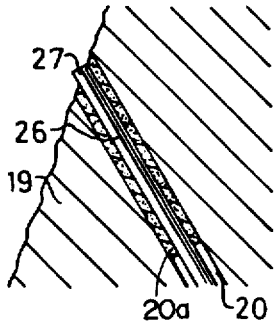
FIG. 2 is a view of a modified detail of FIG. 1 and FIG. 3 a modified embodiment of FIG. 1.

Reference is made in this respect to the detailed view according to FIG. 2 shown by way of example, of a modified embodiment of the device according to the invention, where the upper end 27 of the rod 26 finishes substantially against the surface of the shaft wall 19. In this example the upper part of the rod is cast in the hole 20, for example, according to FIG. 1 by means of concrete *20a as shown in FIG. 2* or the like in order to anchor it firmly in the shaft wall. Because of this arrangement, the end of the rod will be worn substantially to the same extent as the shaft wall. *The rod is otherwise out of contact with the wall of the hole 20.*

To return to the arrangement according to FIG. 1, the vibrations are transmitted through the rods or tubes to suitable indicating instruments 27 and 28, respectively. Such instruments are, for example, accelerometers, microphones or the like. Each such instrument is shown connected in an individual circuit including an amplifier 29, 30, respectively, and a signal lamp 31, 32, respectively, for example. The amplifiers 29 and 30 are arranged so that the signal lamp 31 lights up when the level of the material falls below the rod end 24 and the signal lamp 32 lights up if the level of the material falls below the rod end 25. Of course, instead of the lamps 31 and 32 acoustic arrangements, pointers, recorders or the like may be used. According to the invention said circuits are only connected while tapping is in progress since their function is dependent on the movement of the material 13.

FIG. 3 illustrates a modified application of the invention when automatic control of a tapping hatch is desired as long as the filling level in the shaft is below a certain predetermined level.

In this Figure, which agrees in principle with FIG. 1, the indicating instruments 27 and 28 and the amplifiers 29, 30, respectively, are electrically connected to a magnetic valve 33 which regulates the supply of operating medium to the motor 16 so that this cannot start and open the tapping hatch 15 as long as the level of the material in the shaft 10 is below the rod end 24, that is as long as the material 13a shown can fall freely directly onto the rod end 24, thus causing extremely strong vibrations. It is assumed that the supply of said operating medium to the motor 16 was previously cut off by the level of material falling below the rod end 25 so that the amplifier 30 closed the magnetic valve 33.

When so much material 13 has thereafter been poured into the shaft that the level rises above the rod end 24, the vibrations along the rod 22 will decrease in a characteristic manner. The amplifier 29 is arranged so that when this new strength of signal is received, it will cause the magnetic valve 33 to open again so that the motor 16 can start.

Of course more than two filling levels can be supervised by the device described according to the invention.

The invention is not limited to the embodiments shown and described but can be varied in many ways within the scope of the following claims.

We claim:

1. Method of supervising the filling level and downward movement of granular material in a vertically elongated space, which comprises pouring said material into said space past and in engagement with at least one sensing mechanism placed at a level substantially above the bottom of said space located in the downward path of said material, transforming the movement of the material engaging said sensing mechanism when falling down into said space into vibrations, converting said vibrations into indication signals denoting the falling of material past said sensing mechanism, whereby, when material in the space has reached a level above said sensing mechanism, substantially no vibration is transmitted.

2. Method according to claim 1, which comprises transforming said movement of the material mechanically into vibrations.

3. Method according to claim 2, in which the sensing mechanism includes an elongated body influenced by the movement of the material to produce vibrations thereof.

4. Method according to claim 3, in which the body has its end in the path of movement of the material.

5. Method according to claim 3 which includes sensing oscillatory movements of the other end of the body.

6. Method according to claim 1, which includes transforming the movement of the material when it passes various levels in the space into individual indicating signals which indicate in stages how far the space has been filled.

7. Means for supervising the filling level and downward movement of granular material in a vertically elongated space, said space having a filling opening above the bottom thereof, comprising at least one sensing member arranged in the wall of said space above the bottom and located in the downward path of material fed into said space through said filling opening, *said sensing member comprising a rod device placed substantially spaced from the walls in the hole and being axially fastened near its end in the hole* whereby such material will come into contact with the member when falling down into the space as long as the level of the material in the space is below said member, said member being provided with vibration transmitting means responsive to the fall of material against said member when passing into said space, and an indicating mechanism connected to said vibration transmitting means to indicate the movement of material and filling level in the space[.] *other vibrations being substantially not sensed in the member because of the spaced positioning of the rod means in the hole.*

8. Means according to claim 7, in which said member comprises a [sensing member] *rod* which is mechanically influenced by the material.

9. Means according to claim 8, in which the sensing member is located at least partially in the path of movement of the material in the space.

10. Means according to claim 8, in which the sensing member is in indirect communication with the path of movement of the material.

[11. Means according to claim 7, in which the sensing member comprises an elongated body, one end of which is at least indirectly influenced by the movement of the material.]

12. Means according to claim [11,] 7, in which the other end of the elongated body is connected with the indicating mechanism.

13. Means according to claim 7, in which a plurality of members caused to vibrate by the movement of the material are located at various levels along the space, each being connected to its own indicating instrument.

* * * * *